United States Patent [19]
Damask et al.

[11] Patent Number: 5,711,691
[45] Date of Patent: Jan. 27, 1998

[54] SELF-CLOSING AND SELF-SEALING VALVE DEVICE FOR USE WITH INFLATABLE STRUCTURES

[75] Inventors: Thomas V. Damask, Glendale; Daniel A. Pharo, Valencia, both of Calif.

[73] Assignee: Air Packaging Technologies, Inc., Valencia, Calif.

[21] Appl. No.: 645,094

[22] Filed: May 13, 1996

[51] Int. Cl.⁶ .................................................. B63B 35/58
[52] U.S. Cl. ................................... 441/41; 137/512.15
[58] Field of Search ............................. 441/38, 40, 41, 441/96; 137/512.15

[56] References Cited

U.S. PATENT DOCUMENTS 4,708,167  11/1987  Koyannagi ..................... 137/512.15

Primary Examiner—Jesus D. Sotelo
Attorney, Agent, or Firm—Oppenheimer Poms Smith

[57] ABSTRACT

A self-closing and self-sealing valve device for use with inflatable structures. The valve device comprises a pair of relatively flat plastic sheets which are disposed over one another in facewise engagement, and form an air inlet end and air outlet end, the latter of which is disposed in the inflatable structure. The valve is constructed by providing two longitudinal heat seals in proximity to the longitudinal margins of the pair of plastic sheets or strips. An adhesive zone is formed interiorly of the two longitudinal heat seals and causes a self-closing and self-sealing of the valve device. The adhesive zone further precludes any sealing of the two sheets in the adhesive zone during longitudinal sealing operations since sealing will not occur with the presence of the adhesive. In this way, since the two sheets are adhesively secured to one another, there is no back flow from the inflatable and deflatable structure outwardly of the structure even under low pressure condition. However, by engaging terminal ends of the two sheets, one can introduce an expandable gas into and through the valve device. The two strips will separate from one another, notwithstanding the adhesive zone, when a gas, such as air under pressure, is forced through the adhesive zone. A unique method of forming the valve is also disclosed wherein there is a complete assurance that there will be no transverse gap or interruption of adhesive in the adhesive zone of the valve passageway.

30 Claims, 2 Drawing Sheets

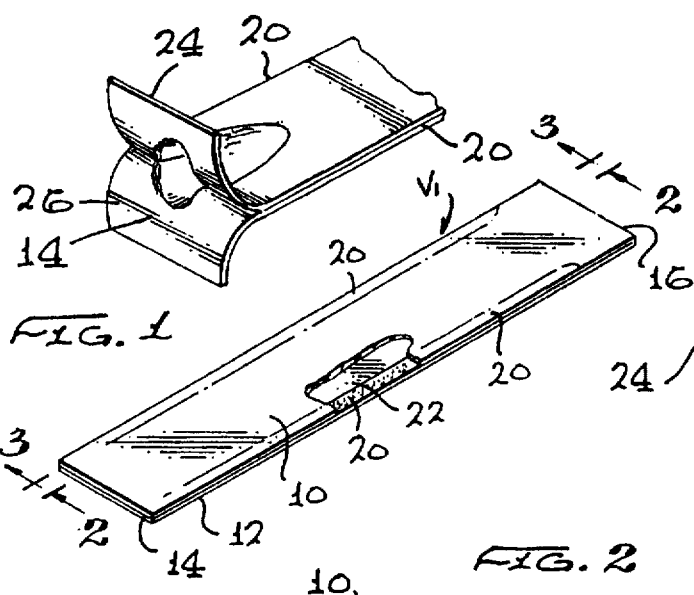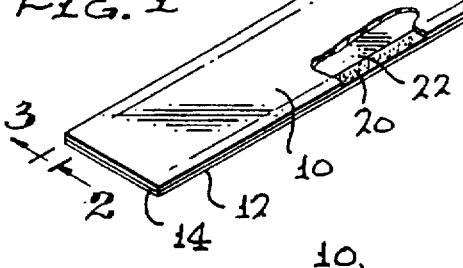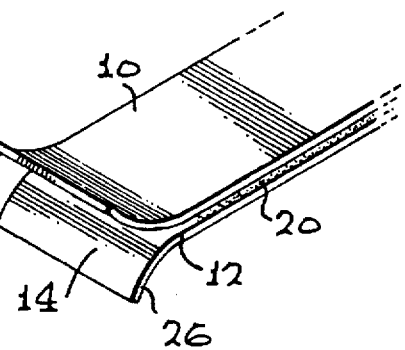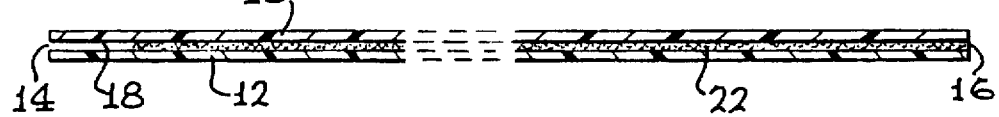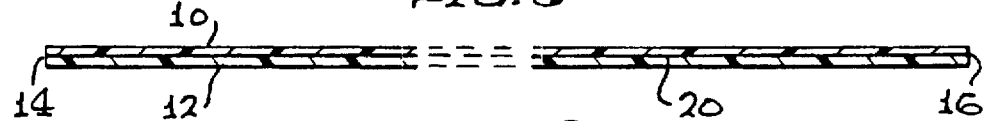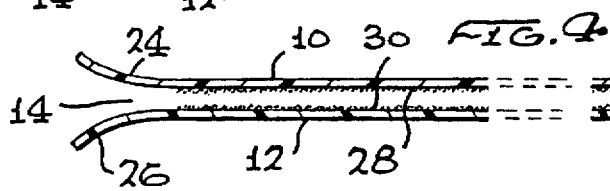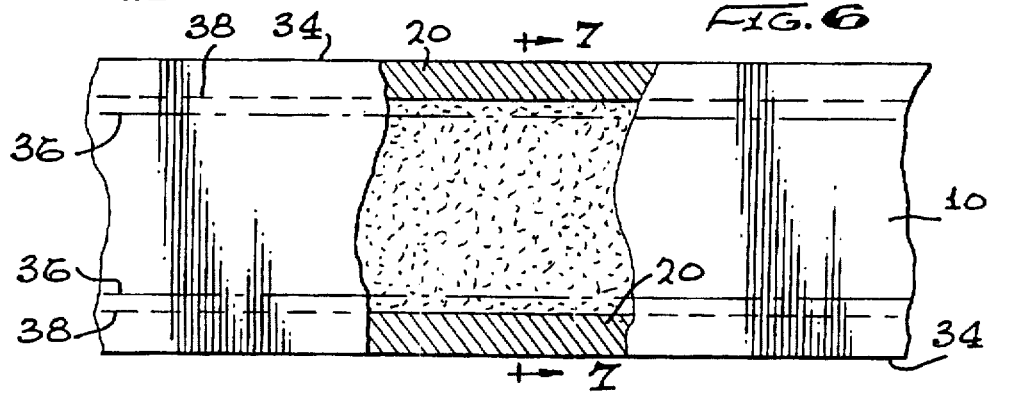

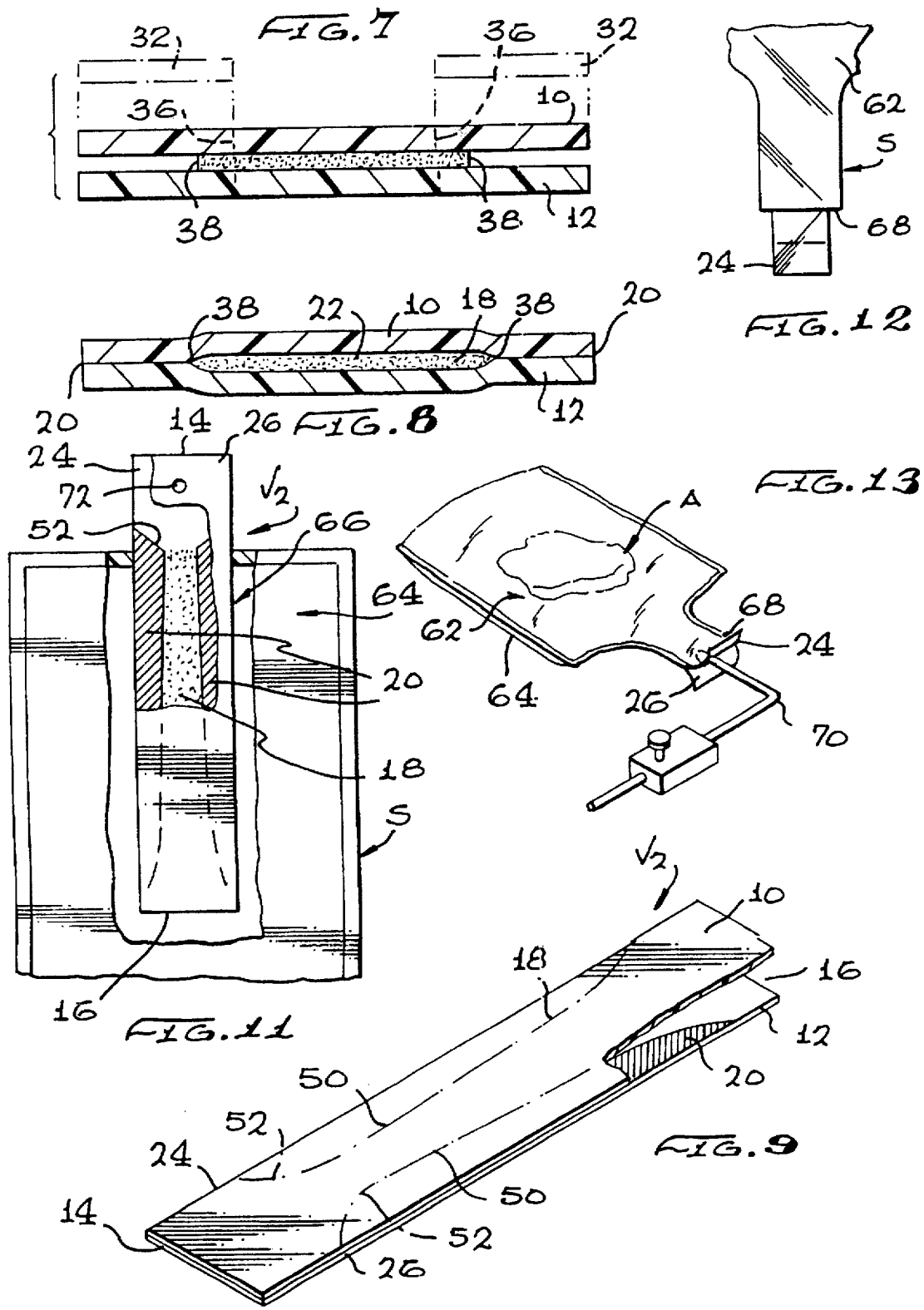

SELF-CLOSING AND SELF-SEALING VALVE DEVICE FOR USE WITH INFLATABLE STRUCTURES

BACKGROUND OF THE INVENTION

1. Field of the Invention

This invention relates in general to certain new and useful improvements in a self-closing and self-sealing valve device, and more particularly, to a valve device of the type stated, which can be used with and operated as a check valve with an inflatable structure.

2. Brief Description of the Prior Art

Air inlet valves are frequently used in inflatable and deflatable structures, as for example, balloons, and more particularly in various packaging systems which can be inflated with an expandable gas, such as air or helium, etc. Frequently, these packaging structures are expanded merely by engaging an inlet of a valve and blowing into the packaging structure. In theory, the valve operates as a check valve and thereby precludes air from being pushed outwardly through the valve.

There are numerous packaging systems in which valves of this type are frequently employed. Representative of some of these packaging systems with which check valves of this type can be used are:

1. U.S. Pat. No. 4,918,904, dated Apr. 24, 1990, by Daniel A. Pharo for Method for Forming Clam-Like Packaging System.
2. U.S. Pat. No. 5,487,470, dated Jan. 30, 1996, by Daniel A. Pharo for Merchandise Encapsulating Packaging System and Method Therefor.
3. U.S. Pat. No. 5,272,856, dated Dec. 28, 1993, by Daniel A. Pharo for Packaging Device that is Flexible, Inflatable and Reusable and Shipping Method Using the Device.
4. U.S. Pat. No. 4,874,093, dated Oct. 17, 1989, by Daniel A. Pharo for Clam-Like Packaging System. The above-identified list of prior art expandable and deflatable structures is only representative, and certainly a non-limiting list.

In many of these cases, the manufacturer of the inflatable and deflatable structure will resort to the design of his or her own inlet valve, which frequently will adopt the form of a check valve. Very often, where attention is devoted to the construction of the inflatable and deflatable member, little attention is devoted to the details of the valve construction. Consequently, the prior art inlet valve devices often suffer from leaking, have a short longevity, and are frequently subject to malfunctions.

U.S. Pat. No. 4,674,532, dated Jun. 23, 1987, by Koyanagi, discloses a check valve for use in filling balloons and like structures. This valve has an inlet designed for engagement with an air source or other gas source, for introducing the gas into the balloon. U.S. Pat. No. 4,917,646, dated Apr. 17, 1990, by Kieves, also discloses a self-sealing valve for use with a balloon device. To the extent that these valves are representative of prior art valves, there is no mechanism to provide a positive locking action in the valve which will preclude air flow from the interior of the inflatable and deflatable structure to the exterior thereof particularly under low pressure conditions.

The Kieves patent discloses the use of a pair of relatively flat plastic strips which are heat-sealed along their longitudinal margins to provide a valve body. Moreover, Kieves provides for a scrim or ink coating at the inlet end to ensure that the inlet end remains open and is not sealed during the heat-sealing process. However, in accordance with the valve shown in the Kieves patent, it is necessary to force an inflation mechanism into the inlet of the valve in order to cause the valve to open. This inflation mechanism could be in the form of a tube from a gas supply or otherwise a straw or the like.

The Koyanagi U.S. Pat. No. 4,674,532 also discloses a pair of plastic films which are used to form a check valve for a water bag, a balloon or the like. In the Koyanagi check valve, the longitudinal sides of the facewise disposed plastic sheets are heat sealed to create a type of fluid pipe. Moreover, the valve body is closed at the tip end of this fluid pipe but open at the opposite side. Fluid is allowed to flow in one direction from the tip end through gaps between the inner surface pipe surrounding the valve. Fluid flow in the opposite direction of the valve body causes the gas passageway to close to prevent an outward flow due to the air or gas pressure forcing the two valve sheets together.

In both of the aforesaid prior art patents relating to the valves per se, each operate on the principle that the pressure on the inside of the inflatable structure will force two sheets forming the valve to close, thereby causing the valve to close against a backward flow and thereby operate as a check valve. However, while this is moderately effective where a large pressure differential exists between the interior of the inflatable structure and the ambient atmosphere, it becomes relatively inefficient under low pressure conditions. Under such conditions, the valve begins to leak. As the pressure in the inflatable structure further reduces, the valve becomes even more inefficient and hence, there is a run-away condition with deterioration of valve efficiency.

In certain packaging system, such as the so-called "void filled" packaging, where there is little or no pressure differential between the ambient atmosphere and the package interior chamber, leakage is a common and pronounced problem. Further, where climatic conditions may change, such as the packaging being introduced into a colder temperature, the pressure on the interior of the package will reduce. This leads to a leakage through the valve again with a run-away deterioration of valve efficiency.

There has been a need for a valve with a positive locking action which will not leak, particularly under low pressure conditions and which can be effectively and efficiently used with inflatable and deflatable structures, such as balloons and the like.

OBJECTS OF THE INVENTION

It is, therefore, one of the primary objects of the present invention to provide an inlet valve for an inflatable structure which allows air or other gas to be introduced into the structure, and which is highly efficient in operation.

It is another object of the present invention to provide a valve device of the type stated for use with inflatable structures which is efficient under low pressure conditions, and does not result in substantial leakage under low pressure conditions.

It is a further object of the present invention to provide a valve device of the type stated which is particularly effective in balloons and packaging bags and other plastic and rubber inflatable and deflatable structures.

It is an additional object of the present invention to provide an inlet valve of the type stated which is highly efficient in operation and which can be made at a relatively low cost.

It is also an object of the present invention to provide a valve device of the type stated which provides for easy opening with a funnel shape into an air passageway in the valve by parting two entry end flaps on sheets forming part of the valve device.

It is still another object of the present invention to provide a valve device of the type stated which is highly efficient in operation and maintains a high degree of efficiency over long time periods thereby increasing the longevity of any packaging system with which the valve device is used.

It is another salient object of the present invention to provide a method of making an inlet valve which can be used in inflatable and deflatable structures on a highly efficient and low cost basis.

With the above and other objects in view, our invention resides in the novel features of form, construction, arrangement and combination of parts and components presently described and pointed out in the claims.

BRIEF SUMMARY OF THE INVENTION

A self-closing and self-sealing valve device for use in inflatable and deflatable structures such as inflatable and deflatable plastic packaging, balloons and the like. Certain of the types of packaging systems with which the inflatable valve of the invention can be used are previously described.

The self-closing and self-sealing valve devices are formed preferably of plastic materials of the type which are typically used in plastic inflatable structures, such as structures formed of polyethylene, polypropylene, etc.

The self-closing and self-sealing valve device of the invention comprises a pair of relatively flat flexible sheets and preferably plastic sheets, which are disposed upon one another in facewise engagement. The sheets, when facewise disposed on one another, form an inlet end and outlet end, and with a gas passageway or so-called "valve passageway" therebetween. Typically, the outlet end is located in an interior chamber of the expandable structure.

In a preferred embodiment, the flexible flat plastic sheets have a pair of longitudinal connecting regions, typically extending along and in proximity to the longitudinal margins thereof, and which connecting regions may adopt the form of longitudinal heat seals. These connecting regions extend approximately from the inlet end to the outlet end of the two plastic sheets. The heat seals secure the two sheets together with the gas passageway therebetween.

With respect to the closing of the valve device, an adhesive coating is provided in the gas passageway and substantially seals the gas passageway for most of the full distance between the inlet end and the outlet end. However, the valve is constructed so that there is an assurance that there is a complete adhesive coating between the two longitudinal heat seals without any gap for the full transverse dimension between the two heat seals. This adhesive coating is effective to create a gas-tight seal and prevents gas from being expelled into the outlet end and exiting through the inlet end in a back-flow condition. However, the seal will open when gas is introduced at the inlet end under sufficient pressure to cause an opening of the seal without any need for a mechanical implement to open the same.

When the inlet end is slightly opened by pulling on two tabs on the ends of the two sheets at the inlet opening, a funnel-shaped opening is formed by these two end portions of the sheets. In this way, a gas under pressure can be introduced and will force the two valve sheets apart, even in the adhesive zone, thereby allowing gas under pressure to flow through the valve passageway and enter into the interior chamber. However, when the inflation process has ceased, the two sheets will be forced into contact with one another through the surrounding gas pressure in the sheets and the adhesive coating will hold the two sheets together thereby precluding any escape of gas from the interior chamber to the exterior, even under very low pressure conditions.

When forming the valve device, the adhesive coating is placed in a central region on one of the sheets, which does not extend to the edges of the sheets but does extend transversely into the region in which longitudinal heat seals would normally be created. Since the plastic sheets will not accept a heat seal in the region of any adhesive coating, when a heat seal is applied, only the region in proximity to the longitudinal margins of the sheets are secured together, allowing the adhesive to extend up to the inner edges of the longitudinal heat seals. This allows the formation of the gas passageway therebetween.

Thus, as indicated herein, the adhesive coating operates to prevent a heat sealing of the plastic sheets in the region where there is an adhesive coating. In this way, a heat seal can be applied almost to the full surface of the two sheets spaced somewhat inwardly of the longitudinal edges thereof, such that only the outer margins of the longitudinal heat seals will be formed. This ensures the fact that the longitudinal seals will extend fully up to the adhesive zone and there will be no gaps of adhesive in the valve passageway. In this way, there will be a full gas-tight seal for the entire transverse dimension of the gas passageway at any point along the longitudinal dimension of the valve passageway where the adhesive coating exists.

In a more preferred embodiment of the invention, the longitudinal heat seals form a truncated gas passageway. More preferably, the longitudinal heat seals are provided in such manner that they taper from the outlet end to the inlet end, such that there is a smaller inlet end than outlet end. This has been found to be highly effective in maintaining a seal in the interior chamber of the inflatable and deflatable structure, even under low pressure conditions.

In another preferred embodiment of the invention, the plastic sheets may be provided at their inlet ends with a pair of outwardly extending tabs which may be integral with the sheets. In this way, the tabs are capable of being manually engaged and manually spread apart when it is desired to inflate the inflatable structure. One of the unique aspects of the present invention results from the combination of the longitudinal margin heat seal construction and the extending tabs on the two valve sheets. The construction is such that a funnel shaped opening is obtained when the tabs are spread apart. In effect, the material forms a type of pucker at this funnel shaped inlet opening which allows for easy inflation of the inflatable structure.

Inflation may readily occur by putting one's lips to the edge of the two sheets forming the valve and merely blowing into the interior of the chamber. Otherwise, a gas tank having a filling implement may be used. In either case, when there is sufficient pressure, the pressure of the gas will overcome the adhesive force in the adhesive zone and will allow the two sheets to spread apart, such that gas can enter into the interior chamber. However, gas cannot be expelled from the interior chamber through the valve mechanism. Another means must be provided on the inflatable and deflatable structure for purposes of deflation.

The present invention has many other purposes and has other advantages which will be made more fully apparent from the consideration of the forms in which it may be embodied. One of these forms of the valve and of the inflatable structure and the method of forming the valve is described in the following detailed description of the invention, and is also illustrated in the drawings which accompany this present specification. However, it should be understood that this detailed description and the accompanying drawings are only set forth for purposes of illustrating the general principles of the invention and are not to be taken in a limiting sense.

BRIEF DESCRIPTION OF THE DRAWINGS

Having thus described the invention in general terms, reference will now be made to the accompanying drawings in which:

FIG. 1 is a perspective view, partially broken away, of an inlet valve constructed in accordance with and embodying the present invention;

FIG. 2 is a vertical sectional view taken along line 3—3 of FIG. 1 and showing a valve passageway with an adhesive zone therein;

FIG. 3 is a vertical sectional view taken along line 3—3 of FIG. 1 and showing the heat seals in proximity to and extending along the longitudinal margins of the sheets forming the valve;

FIG. 4 is a sectional view, somewhat similar to FIG. 2 but showing the sheets forming the valve in a separated condition during an introduction of gas through the valve passageway in the valve;

FIG. 5 is a fragmentary perspective view showing the opening of a pair of flaps at the inlet end of the valve;

FIG. 6 is a top plan view, partially broken away and in section, and showing a step in the method of forming the valve with an adhesive zone fully abutting against the longitudinal heat seals;

FIG. 7 is a somewhat schematic sectional view taken along line 7—7 of FIG. 6 and showing the adhesive zone and the zones of heat seals;

FIG. 8 is a sectional view, somewhat similar to FIG. 7 and showing the valve passageway and the formation of the valve passageway between two valve sheets;

FIG. 9 is a perspective view, partially broken away, of a modified form of valve constructed in accordance with and embodying the present invention;

FIG. 10 is a fragmentary perspective view of the valve of FIG. 9 showing end tabs pulled apart to form a funnel shaped inlet opening;

FIG. 11 is an elevational view, partially broken away and in section, and showing a further modified form of valve secured into an inlet end of an inflatable structure;

FIG. 12 is a fragmentary top plane view showing the valve device projecting outwardly from a portion of an inflatable structure with the manually engagable end tabs thereon; and FIG. 13 is a perspective view showing the filling of an inflatable structure with the valve device of the present invention.

DETAILED DESCRIPTION OF PREFERRED EMBODIMENTS

Referring now in more detail and by reference characters to the drawings which illustrate practical embodiments of the present invention $V_1$, designates a self-closing and self-sealing valve of the type particularly adapted for use in inflatable and deflatable structures such as packaging systems, balloons and the like. One such inflatable structure S is more fully illustrated FIGS. 10–12 of the drawings.

Referring now to FIGS. 1–4 of the drawings, the valve $V_1$ is comprised of a pair of flexible and foldable sheets of 10 and 12 such as plastic sheet material. The sheet material which is employed is preferably a relatively gas impermeable plastic sheet material such as polyethylene, polypropylene or the like.

The valve $V_1$ is formed with an openable inlet end 14 and an openable outlet end 16 with a so-called "valve passageway" 18 formed therebetween. The two flexible and foldable sheets 10 and 12 are sealed together by means of longitudinal heat seals 20 in proximity to longitudinal margins of the sheets, as best shown in FIGS. 1, 5, 6 and 8 of the drawings. These longitudinal heat seals 20 thereby define the valve passageway 18.

The interior surface of the two flexible and foldable sheets 10 and 12 are held in facewise contact with one another, as schematically shown in FIG. 2, by means of an adhesive coating 22. Moreover, and by further reference to FIG. 2, it can be seen that the adhesive coating 22 extends for most of the full length of the two flexible and foldable sheets 10 and 12 except for two end tabs 24 and 26 on the flexible and foldable sheets 10 and 12, respectively. These ends tabs 24 and 26 are capable of being manually grasped by the fingers of the user and spread apart in order to form a funnel shaped entry into valve passageway 18, as shown in FIGS. 4 and 5 of the drawings. In effect, the ends of the sheets 10 and 12 form somewhat a funnel shaped section and the exterior surface of the sheets at the inlet and have a somewhat wrinkled configuration as in the form of a pucker. This funnel shaped opening becomes even more pronounced with a valve of the embodiment as shown in FIGS. 9 and 10, hereafter described.

It can be observed that the adhesive can be applied to both of the facing surfaces or walls of the two flexible and foldable sheets 10 and 12 with adhesive layers 28 and 30, respectively, or otherwise, an adhesive coating 22 could be applied only to one of the interiorally presented walls of the flexible and foldable sheets 10 or 12. The adhesive which is used in the present invention is preferably a water base polymer carried in an organic solvent such as toluene or the like, many other adhesives, such as several known polyimides may also be used. It is important in connection with the present invention to assure that there is no adhesive in the region of the two end tabs 24 and 26 in order to enable the flexible and foldable sheets 10 and 12 to be spread apart relative to one another and thereby enable access to the openable inlet end 14. However, in connection with the present invention, in order to ensure a gas-tight seal at low pressure conditions, it is important to ensure that the adhesive zone, that is, adhesive in the entire transverse dimension of the gas passageway, from one longitudinal heat seal 20 to the opposite longitudinal heat seal 20, extends fully up to these seals.

Although it is preferable to have the adhesive zone extend for a substantial portion of the distance between the openable inlet end 14 and the openable outlet end 16, it is not absolutely necessary. However, in all regions in which an adhesive is applied in the valve passageway and which is usually the greater portion of the overall longitudinal dimension of the valve passageway, it is quite important to ensure that there are no gaps transversely. In this way, there will be an effective seal between the two sheets which prevents the exit of gas under low pressure conditions.

Both FIGS. 2 and 4 show that in a preferred embodiment, the adhesive zone extends for almost the full cross-section of the gas passageway for most of the longitudinal dimension of the two flexible and foldable sheets 10 and 12. Moreover, and by reference to FIG. 6, it can be seen that the adhesive coating 22 actually extends up to the very edges of the longitudinal heat seals 20 without any gaps therebetween.

In order to ensure a complete adhesive coating or so-called "tackifyer coating" across the entire transverse dimension between the longitudinal heat seals 20, the adhesive is applied by the flexgraphic process using a flexgraphic roller, that is, a roller having a pattern equivalent to the adhesive zone. The flexgraphic roller will apply the adhesive to the inner facing surface of one or both of the flexible and foldable sheets 10 or 12. The flexible and foldable sheets 10 and/or 12 are pulled through the adhesive application process with controlled tension in the web direction. In order to achieve a sufficient adhesive coating in the transverse dimension, that is from longitudinal seal to longitudinal seal, the adhesive coating is applied over a transverse dimension which is initially greater than the inner transverse dimension of longitudinal sealing irons. Thus, longitudinal heat sealing irons 32, shown in phantom lines in FIG. 7, would normally create a longitudinal seal extending from an outer edge 34 in FIG. 6 to an margin 36 in FIG. 6. It should be noted in this respect, that FIG. 7 is only schematic since it does now show the actual heat seals, but more fully shows the dimensional relationship between an adhesive zone and the zone of the longitudinal heat seals.

In absence of any adhesive, each longitudinal heat seal 20 would have a dimension between the edges 34 and 36. However, in order to ensure that the adhesive is in full contact with the actual inner edge of the longitudinal heat seal, the adhesive is applied between adhesive zone boundaries 38 which define the actual edges of the longitudinal heat seals 20. Consequently, the longitudinal heat seals will not form in the region between the boundaries 36 and 38. Nevertheless, this still leaves a sufficient longitudinal heat seal 20 at and extending along each of the longitudinal margins of the sheets 10 and 12 and also ensures that the adhesive will lie in contact with the very inner edge of the longitudinal heat seals 20.

FIGS. 9 and 10 illustrate a modified form of valve $V_2$ constructed in accordance with and embodying the present invention. In this case, like reference numerals will be used to designate like components with respect to the valve $V_1$. The valve $V_2$ also includes flexible and foldable sheets 10 and 12 which are provided with longitudinal heat seals 20. However, in the valve $V_2$, the longitudinal heat seals 20 taper inwardly from the openable outlet end 16 to the openable inlet, end 14, in the manner as best shown in FIG. 9. Thus, the openable outlet end 16 has a larger size than the inlet end with respect to the valve passageway 18, that is the outlet end, has a larger transverse dimension than does the valve passageway at the inlet end. In effect, the longitudinal heat seals 20 are each somewhat truncated from the outlet end toward the inlet end, as shown. Moreover, the longitudinal heat seals 20 stop short of the openable inlet end 14 in order to form the end tabs 24 and 26. Thus, and in this embodiment of the invention, the longitudinal heat seals have tapered inner longitudinal margins 50 which flare outwardly to the edges of the sheet at 52 in FIG. 9. By reference to FIG. 10, it can be seen that the funnel shaped opening is formed with a type of pucker or wrinkled configuration when the unsealed end tabs are spread apart.

This type of longitudinal seal construction with tapered longitudinal margins 50, is also desirable since it further restricts the flow of air during low pressure conditions. The tapered valve passageway closes much more quickly than does the valve passageway formed with straight or edge heat seals 20 and causes a collapsing of the two flexible and foldable sheets 10 and 12 so that they are in inner facewise contact with one another much more quickly.

FIGS. 11–13 illustrate the modified form of self-closing and self-sealing valve $V_2$, mounted within and capable of filling an inflatable and deflatable product package S. The package S typically is provided with a pair of flat sheets such as 62 and 64 which are secured together along their edges to form an interior chamber 66 which is designed to hold and retain an article to be packaged. FIG. 12 more specifically shows the valve mounted at and extending beyond the neck 68 of the product package.

The valve $V_1$ could also be used in place of the valve $V_2$ such that the valve $V_1$ is mounted between two flat sheets 62 and 64 at an inlet end or neck 68 of the package. Moreover, an article A can be retained in the package and suitably protected when the package is inflated. The valve is normally secured within the neck portion 68 of the package S. Moreover, the valve can be actually heat sealed in the package S by heat sealing the same in a fixed position therein, as for example, as shown in FIG. 11 of the drawings. However, the valve is constructed so that a portion of the valve and particularly the two end tabs 24 and 26 are exposed. In this way, the two end tabs 24 and 26 can be separated from one another, as shown in FIG. 13, in order to accommodate a gas inlet 70.

One or both of the end tabs 24 or 26 may be provided with an aperture 72, as shown in FIG. 11, in order to receive a string or like cord, particularly when the valve device is used in balloons.

Thus, there has been illustrated and described a unique and novel self-sealing and self-closing valve device for use with inflatable structures and which is highly efficient in operation. Thus, the present invention fulfills all of the objects and advantages which have been sought therefor. It should be understood that many changes, modifications, variations and other uses and applications will become apparent to those skilled in the art after consideration of this specification and the accompanying drawings. Therefore, any and all such changes, modifications, variations and other uses and applications which do not depart from the spirit and scope of the invention are deemed to be covered by the invention.

Having thus described the invention, what we desire to claim and secure by letters patent is:

1. A self-closing and self-sealing valve device for use in inflatable and deflatable structures, said valve device comprising:

a) a pair of relatively flat flexible sheets disposed upon one another in facewise engagement and having an inlet end and an outlet end with a gas passageway extending therebetween;

b) said flat flexible sheets having a pair of connecting regions extending along opposite side portions of the sheets between the inlet end and the outlet end for securing said two sheets together with air-tight longitudinal seals and with a gas passageway therebetween; and c) an adhesive coating in said gas passageway substantially sealing the gas passageway for the full transverse distance between the connecting regions and for a substantial portion of the distance between the inlet end and the outlet end, said adhesive coating creating a gas-tight seal in the gas passageway to prevent gas from being expelled into the outlet end to exit through the inlet end in a back flow condition but which gas-tight seal will open when gas is introduced at the inlet end under sufficient pressure to cause an opening of the seal without need for a mechanical implement to open same.

2. The self-closing and self-sealing valve device of claim 1 further characterized in that said connecting regions are longitudinally extending heat seals.

3. The self-closing and self-sealing valve device of claim 2 further characterized in that said connecting regions are longitudinally extending heat seals and which abut against inner longitudinal edges of the adhesive coating in the gas passageway such that there are no gaps between the inner longitudinal edges of the seals and the adhesive coating.

4. The self-closing and self-sealing valve device of claim 1 further characterized in that said gas passageway is truncated and larger at the outlet end than at the inlet end.

5. The self-closing and self-sealing valve device of claim 4 further characterized in that said gas passageway tapers for a greater portion of the distance from the outlet end to the inlet end.

6. The self-closing and self-sealing valve device of claim 1 further characterized in that said sheets are plastic sheets capable of being bent and also heat sealed along longitudinal margins thereof.

7. The self-closing and self-sealing valve device of claim 1 further characterized in that said valve device is provided with a pair of end tabs at the inlet end which are capable of being manually spread apart to form a funnel and open an entry into the valve passageway.

8. A self-closing and self-sealing valve device for use in inflatable and deflatable structures, said valve device comprising:
 a) a pair of relatively flat plastic sheets disposed upon one another in facewise engagement and having an inlet end and an outlet end with a gas passageway extending therebetween;
 b) said flat sheets having a pair of longitudinally extending seals extending along the sheets between the inlet end and the outlet end for sealing the two sheets together with air-tight seals in proximity to their longitudinal margins and with a gas passageway therebetween, said longitudinal seals creating the outlet end with a larger size than the inlet end; and
 c) sealing means associated with said gas passageway sealing the gas passageway for a substantial portion of the distance between the inlet end and the outlet end and creating a gas-tight seal to prevent gas from being expelled into the outlet end and exit through the inlet end in a back-flow condition, said respective sizes of inlet and outlet ends aiding in maintaining a gas-tight seal even under relatively low pressure conditions.

9. The self-closing and self-sealing valve device of claim 8 further characterized in that said means in said gas passageway seal is an adhesive creating an adhesive gas-tight seal.

10. The self-closing and self-sealing valve device of claim 9 further characterized in that said gas-tight seal will open when gas is introduced at the inlet end under sufficient pressure to cause an opening of the seal without need for a mechanical implement to open same.

11. The self-closing and self-sealing valve device of claim 8 further characterized in that said sealing means in said gas passageway is an adhesive coating which substantially fully seals the gas passageway across a transverse dimension thereof in the region in which said adhesive coating exists.

12. The self-closing and self-sealing valve device of claim 8 further characterized in that said longitudinal seals are heat seals and which abut against longitudinal edges of an adhesive coating in the gas passageway.

13. The self-closing and self-sealing valve device of claim 12 further characterized in that said gas passageway is truncated and larger at the outlet end than at the inlet end.

14. The self-closing and self-sealing valve device of claim 13 further characterized in that said gas passageway tapers between the outlet end toward the inlet end.

15. An inflatable structure capable of being inflated and expanded with a gas, said structure comprising:
 a) an outer skin having a pair of sides creating an interior inflatable chamber and which sides separate from one another by a greater distance when the structure is expanded;
 b) a pair of relatively flat flexible plastic sheets extending into the interior chamber between the sides of the outer skin, said sheets being disposed upon one another in facewise engagement and having an outlet end in said interior chamber and an inlet end with a gas passageway extending therebetween;
 c) a pair of connecting regions extending along opposite side portions of the sheets between the inlet end and the outlet end for securing said two sheets together with air-tight seals and with the gas passageway therebetween to allow filling and expansion of said chamber; and
 d) an adhesive coating in said gas passageway substantially sealing the gas passageway for the full transverse distance between the connecting regions and for a substantial portion of the distance between the inlet end and the outlet end, said adhesive coating creating a gas-tight seal in the gas passageway to prevent gas from being expelled into the outlet end to exit through the inlet end in a beck-flow condition but which gas-tight seal will open when gas is introduced at the inlet end under sufficient pressure to cause an opening of the seal without need for a mechanical implement to open same.

16. The inflatable structure capable of being inflated and expanded with a gas of claim 15 further characterized in that said connecting regions are longitudinal heat seals and which abut against longitudinal edges of the adhesive coating in the gas passageway such that there are no gaps between the inner longitudinal edges of the edge heat seals and the adhesive coating.

17. The inflatable structure capable of being inflated and expanded with a gas of claim 16 further characterized in that said gas passageway tapers for a substantial portion of the distance between the outlet end to the inlet end and is truncated and larger at the outlet end than at the inlet end.

18. The inflatable structure capable of being inflated and expanded with a gas of claim 17 further characterized in that said valve is provided with a pair of end tabs at the inlet end which extend beyond and outwardly of said pair of sides and which are capable of being manually spread apart to form a funnel shaped inlet opening for enabling an inflation through the valve.

19. A method for forming a self-closing and self-sealing valve of the type used in inflatable structures having an interior inflatable chamber and which provides for effective sealing even under low pressure conditions, said method comprising:
 a) disposing a pair of relatively flat flexible plastic sheets upon one another in facewise engagement;
 b) forming an inlet end and an outlet end with a gas passageway extending therebetween when said sheets are so disposed upon one another;

c) providing an adhesive coating between said two sheets for a substantial portion of the longitudinal dimension of the sheets on a coated region thereof and which coating does not extend to the outer marginal portions of the sheets; and d) heat sealing said flat plastic sheets forming a pair of longitudinal seals extending along the sheets between the inlet end and the outlet end for securing said two sheets together with seals which are air-tight seals and forming a gas passageway therebetween in the region of the adhesive coating, such that the adhesive seals the gas passageway for the full transverse distance between the longitudinal seals and for a substantial portion of the distance between the inlet end and the outlet end of the two sheets to prevent gas from being expelled into the outlet end to exit through the inlet end under low pressure conditions.

20. The method for forming a self-closing and self-sealing valve of the type used in inflatable structures of claim 19 further characterized in that said method comprises applying the adhesive coating in such amount that the gas passageway will open when gas is introduced at the inlet end under sufficient pressure to cause an opening of the seal without need for a mechanical implement to open same.

21. The method for forming a self-closing and self-sealing valve of the type used in inflatable structures of claim 20 further characterized in that the method comprises tapering the heat seals from the outer end of the gas passageway to the inner end so that said gas passageway is truncated and larger at the outlet end than at the inlet end.

22. An inflatable structure capable of being inflated and expanded with a gas, said structure comprising:

(a) an outer skin having a pair of sides creating an interior inflatable chamber and which sides separate from one another by a greater distance when the structure is expanded;

(b) a pair of relatively flat flexible plastic sheets extending into the interior chamber between the sides of the outer skin, said sheets being disposed upon one another in facewise engagement to form a valve having an outlet end in said interior chamber and an inlet end with a gas passageway extending therebetween;

(c) a pair of connecting regions extending along opposite side portions of the sheets from the inlet end to the outlet end for securing said two sheets together with air-tight seals and with the gas passageway therebetween to allow filling and expansion of said chamber; and (d) a pair of tabs extending from said sheets outwardly to and beyond said sides, said tabs having longitudinal margins not secured to one another such that said tabs may be manually engaged by a user of the structure and spread apart to allow access to said inlet.

23. The inflatable structure capable of being inflated and expanded with a gas of claim 22 further characterized in that an adhesive coating is in said gas passageway substantially sealing the gas passageway for a substantial portion of the distance between the inlet end and the outlet end, said adhesive coating creating a gas-tight seal in the gas passageway to prevent gas from being expelled into the outlet end to exit through the inlet end in a back flow condition but which gas-tight seal will open when gas is introduced at the inlet end under sufficient pressure to cause an opening of the seal without need for a mechanical implement to open same.

24. The inflatable structure capable of being inflated and expanded with a gas of claim 23 further characterized in that the adhesive coating seals the gas passageway for the full transverse distance between connecting regions.

25. The inflatable structure capable of being inflated and expanded with a gas of claim 22 further characterized in that an adhesive coating is in said gas passageway for a substantial portion of the distance between the inlet end and the outlet end, and said connecting regions are longitudinal heat seals and which abut against longitudinal edges of the adhesive coating in the gas passageway such that there are no gaps between the inner longitudinal edges of the seals and the adhesive coating.

26. The inflatable structure capable of being inflated and expanded with a gas of claim 22 further characterized in that said skin has a neck region and said tabs extend outwardly beyond said neck region.

27. The inflatable structure capable of being inflated and expanded with a gas of claim 22 further characterized in that at least one of said tabs has a hole to receive a cord.

28. An inflatable structure capable of being inflated and expanded with a gas, said structure comprising:

(a) an outer skin having an interior inflatable chamber and which can be expanded when the structure is inflated;

(b) a pair of relatively flat flexible plastic sheets secured along longitudinal margins extending into the interior chamber to form a valve having an outlet end in said interior chamber and an inlet end with a gas passageway extending therebetween; and (c) a pair of tabs extending from said sheets outwardly to and beyond said sides, said tabs having longitudinal margins not secured to one another such that said tabs may be manually engaged by a user of the structure and spread apart to automatically form a funnel shaped opening at the inlet end to facilitate inflation of the chamber through the inlet end.

29. The inflatable structure capable of being inflated and expanded with a gas of claim 28 further characterized in that an adhesive coating is in said gas passageway substantially sealing the gas passageway for a substantial portion of the distance between the inlet end and the outlet end, said adhesive coating creating a gas-tight seal in the gas passageway to prevent gas from being expelled into the outlet end to exit through the inlet end in a back flow condition but which gas-tight seal will open when gas is introduced at the inlet end under sufficient pressure to cause an opening of the seal without need for a mechanical implement to open same.

30. The inflatable structure capable of being inflated and expanded with a gas of claim 28 further characterized in that an adhesive coating is in said gas passageway for a substantial portion of the distance between the inlet end and the outlet end, and the adhesive coating seals the gas passageway for the full transverse distance between longitudinal connecting regions thereof, and that said connecting regions are longitudinal heat seals and which abut against longitudinal edges of the adhesive coating in the gas passageway such that there are no gaps between the inner longitudinal edges of the seals and the adhesive coating.

* * * * *